United States Patent
Zhang et al.

(10) Patent No.: US 12,198,276 B2
(45) Date of Patent: *Jan. 14, 2025

(54) ELECTRONIC DEVICE WITH COORDINATED CAMERA AND DISPLAY OPERATION

(71) Applicant: Apple Inc., Cupertino, CA (US)

(72) Inventors: Sheng Zhang, San Jose, CA (US); Aleksandr M. Movshovich, Santa Clara, CA (US); Arthur Y. Zhang, San Jose, CA (US); Chaohao Wang, Sunnyvale, CA (US); Moinul H. Khan, San Jose, CA (US); Paolo Sacchetto, Cupertino, CA (US); Yunhui Hou, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,113

(22) Filed: Jul. 10, 2020

(65) Prior Publication Data

US 2020/0342678 A1 Oct. 29, 2020

Related U.S. Application Data

(63) Continuation of application No. 15/989,756, filed on May 25, 2018, now Pat. No. 10,748,340.
(Continued)

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *H04N 23/667* (2023.01);
(Continued)

(58) Field of Classification Search
None
See application file for complete search history.

(56) References Cited

U.S. PATENT DOCUMENTS 6,902,513 B1 * 6/2005 McClure ............ A63B 24/0006
   482/4
8,855,461 B2   10/2014 Matsuyama
   (Continued)

FOREIGN PATENT DOCUMENTS

CN   105393283 A *  3/2016   ......... G02B 27/0172
EP     2447758 A1 *  5/2012   ......... G02B 27/0172

OTHER PUBLICATIONS

Umbra 3D, Why Optimization is Everything in Mobile AR and VR, 2018, HackerBay, retrieved from "https://blog.hackerbay.io/why-optimization-is-everything-in-mobile-ar-and-vr-b54a5dc411b5", Accessed Sep. 25, 2021 (Year: 2018).*
(Continued)

*Primary Examiner* — Michael J Cobb
(74) *Attorney, Agent, or Firm* — Treyz Law Group, P.C.; Tianyi He

(57) ABSTRACT

An electronic device may have a camera and a display. The display may be configured to display virtual reality content for a user in which no real-world content from the camera is displayed or mixed reality content in which a combination of real-world content from the camera and overlaid virtual reality content is displayed. Control circuitry in the device may adjust the display and camera while transitioning between virtual reality and mixed reality modes. The control circuitry may reconfigure the camera to exhibit a desired frame rate immediately upon transitioning from virtual reality mode to mixed reality mode. Transitions between modes may be accompanied by smooth transitions between frame rates to avoid visible artifacts on the display. The camera frame rate may be synchronized to the display frame
(Continued)

rate for at least part of the transition between the virtual reality and mixed reality modes.

18 Claims, 5 Drawing Sheets

Related U.S. Application Data

(60) Provisional application No. 62/539,219, filed on Jul. 31, 2017.

(51) Int. Cl.
*H04N 5/232* (2006.01)
*H04N 23/667* (2023.01)
*H04N 23/951* (2023.01)

(52) U.S. Cl.
CPC ... *H04N 23/951* (2023.01); *G02B 2027/0138* (2013.01); *G02B 2027/0178* (2013.01)

(56) References Cited

U.S. PATENT DOCUMENTS

| | | | |
|---|---|---|---|
| 9,081,177 B2 | 7/2015 | Wong et al. | |
| 9,389,424 B1 | 7/2016 | Schowengerdt | |
| 9,651,789 B2 | 5/2017 | Osterhout et al. | |
| 9,690,374 B2 | 6/2017 | Clement et al. | |
| 9,958,934 B1 | 5/2018 | Mullen | |
| 10,803,663 B2* | 10/2020 | Wang | G06F 3/04815 |
| 10,887,573 B1* | 1/2021 | Kenrick | H04N 13/194 |
| 11,036,456 B1* | 6/2021 | Chor | G06F 16/904 |
| 11,178,376 B1* | 11/2021 | Tichenor | G06F 3/011 |
| 2008/0120561 A1 | 5/2008 | Woods | |
| 2010/0079508 A1* | 4/2010 | Hodge | G06F 1/3265 |
| | | | 345/697 |
| 2011/0304541 A1 | 12/2011 | Dalal | |
| 2014/0361976 A1 | 12/2014 | Osman et al. | |
| 2014/0364212 A1* | 12/2014 | Osman | G06F 3/013 |
| | | | 463/31 |
| 2014/0368519 A1* | 12/2014 | Wood | G09G 5/12 |
| | | | 345/545 |
| 2015/0324002 A1 | 11/2015 | Quiet et al. | |
| 2015/0324568 A1 | 11/2015 | Publicover et al. | |
| 2016/0042566 A1* | 2/2016 | Mao | G06F 3/048 |
| | | | 463/32 |
| 2016/0202082 A1 | 7/2016 | Vandanapu et al. | |
| 2016/0247254 A1* | 8/2016 | Behrens | G06F 1/163 |
| 2016/0253843 A1 | 9/2016 | Lee | |
| 2016/0357491 A1 | 12/2016 | Oya | |
| 2017/0039766 A1 | 2/2017 | Passmore et al. | |
| 2017/0115488 A1* | 4/2017 | Ambrus | G06T 11/60 |
| 2017/0124384 A1 | 5/2017 | Allyn | |
| 2017/0157512 A1 | 6/2017 | Long et al. | |
| 2017/0178408 A1* | 6/2017 | Bavor, Jr. | G02B 27/017 |
| 2017/0236330 A1* | 8/2017 | Seif | G06F 3/0202 |
| | | | 345/633 |
| 2017/0251176 A1* | 8/2017 | Smolyanskiy | H04N 13/344 |
| 2017/0365207 A1* | 12/2017 | Maaranen | G09G 3/2096 |
| 2018/0033204 A1* | 2/2018 | Dimitrov | G06T 15/20 |
| 2018/0095529 A1 | 4/2018 | Tokubo | |
| 2018/0276891 A1* | 9/2018 | Craner | G06T 19/20 |
| 2018/0286101 A1 | 10/2018 | Tanner et al. | |
| 2019/0196771 A1* | 6/2019 | Kunitomo | G09G 5/003 |
| 2020/0084387 A1* | 3/2020 | Baldwin | H04N 5/2258 |
| 2021/0183290 A1* | 6/2021 | Sato | G09G 3/20 |
| 2022/0155595 A1* | 5/2022 | Wang | G06F 3/147 |

OTHER PUBLICATIONS

Robert Xiao, Hrvoje Benko, "Augmenting the Field-of-View of Head-Mounted Displays with Sparse Peripheral Displays", 2016, Proceedings of the 2016 CHI Conference on Human Factors in Computing Systems, pp. 1221-1232 (Year: 2016).*

Wei Fang, Lianyu Zheng, Huanjun Deng, Hongbo Zhang, "Real-Time Motion Tracking for Mobile Augmented/Virtual Reality Using Adaptive Visual-Inertial Fusion", 2017, Sensors 17(5):1037 (Year: 2017).*

Mikael Krasnov, "Using Virtual Reality and 360-degree Photos and Videos in Marketing," 2018, Thesis, Haaga-Helia, University of Applied Sciences, Finland, retrieved from https://www.theseus.fi/bitstream/handle/10024/145823/Mikael%20Krasnovs%20Using%20Virtual%20Reality%20in%20Marketing.pdf?sequence=1 (Year: 2018).*

Raul Mur-Artal, J.M.M. Montiel, Juan D. Tardos, "Orb-Slam: A Versatile and Accurate Monocular SLAM System," 2015, IEEE Transactions on Robotics, 31(5): 1147-1163 (Year: 2015).*

Nicholas Hope, "Which Video Format? PAL or NTSC?", 2015, retrieved from "http://www.bubblevision.com/PAL-NTSC.htm# :~: text= PAL%20is%20optimised%20for%20TVs,both%20PAL%20and%20NTSC%20DVDs." (Year: 2015).*

Akaso, "What is Frame Rate: 24FPS, 30FPS, and 60FPS", 2020, retrieved from "https://www.akasotech.com/blogs/ what-is-frame-rate# :~: text=25fps%2C%20also%20known%20as%20PAL,to%2024%20to%20be%20smoother." (Year: 2020).*

Misha Sra, Sergio Garrido-Jurado, Chris Schmandt, and Pattie Maes, Procedurally Generated Virtual Reality from 3D Reconstructed Physical Space, 2016, VRST'16, Proceedings of the 22nd ACM Conference on Virtual Reality Software and Technology, pp. 191-200 (Year:2016).

JD Hol, TB Schon, F Gustafsson, PJ Slycke, "Sensor Fusion for Augmented Reality," 2006 9th International Conference on Information Fusion, pp. 1-6, DOI: 10.1109/ICIF.2006.301604 (Year: 2006).

Bjorn Blissing, Fredrik Bruzelius, "A Technical Platform using Augmented Reality for Active Safety Testing," 2015 Road Safety & Simulation International Conference Proceedings, pp. 1-11, retrieved from <<http://www.diva-portal.org/smash/get/diva2:974932/FULLTEXT01.pdf>> (Year: 2015).

Federico Mammano, "Looking Through Oculus Rift," 2015, pp. 1-8, retrieved from <<https://github.com/federico-mammano/Looking-Through-Oculus-Rift>> (Year 2015).

Kyung yul Kevin Lim, Preetham Suresh, Jurgen P. Schulze, "Oculuc Rift with Stereo Camera for Augmented Reality Medical Intubation Training" Jan. 2017, IS&T International Symposium on Electronic Imaging, The Engineering Reality of Virtual Reality, https://doi.org/10.2352/ISSN.2470-1173.2017.3.ERVR-089 (Year: 2017).

\* cited by examiner

ELECTRONIC DEVICE WITH COORDINATED CAMERA AND DISPLAY OPERATION

This application is a continuation of U.S. patent application Ser. No. 15/989,756, filed May 25, 2018, which claims the benefit of U.S. provisional patent application No. 62/539,219, filed Jul. 31, 2017. This application claims priority to U.S. patent application Ser. No. 15/989,756 and U.S. provisional patent application No. 62/539,219, which are hereby incorporated by reference herein in their entireties.

FIELD

This relates generally to electronic devices and, more particularly, to devices with cameras and displays.

BACKGROUND

Electronic devices with cameras and displays may be used to present a user with a variety of content. For example, an electronic device may use a camera to capture live video of the real world while overlaying virtual content. It can be challenging to display content in this type of environment. If care is not taken, content will not be displayed with a satisfactory quality and visual artifacts will be present.

SUMMARY

An electronic device may have a camera and a display. The camera may be an outwardly facing camera that captures real-world images. The display may be configured to display virtual reality content for a user in which no real-world content from the camera is displayed or mixed reality content in which a combination of real-world content from the camera and overlaid virtual reality content is displayed.

Control circuitry in the device may adjust the display and camera while transitioning between virtual reality and mixed reality modes. For example, the control circuitry may adjust a display frame rate for the display and may adjust a camera frame rate for the camera.

The control circuitry may reconfigure the camera to exhibit a new frame rate immediately upon transitioning from virtual reality mode to mixed reality mode. Transitions between modes may be accompanied by smooth transitions in display frame rate to avoid visible artifacts on the display. The camera frame rate may be synchronized to the display frame rate for at least some of the virtual reality to mixed reality transition to avoid latency issues.

DETAILED DESCRIPTION

Electronic devices such as head-mounted devices and other devices may be used for virtual reality and mixed reality (augmented reality) systems. These devices may include portable consumer electronics (e.g., portable electronic devices such as cellular telephones, tablet computers, head-mounted device such as googles, glasses, helmets, hats, etc. and/or other wearable equipment), head-up displays in cockpits, vehicles, and other systems, and display-based equipment (projectors, televisions, etc.). Device configurations in which virtual reality and/or mixed reality content is provided to a user with a head-mounted display device are described herein as an example. This is, however, merely illustrative. Any suitable equipment may be used in providing a user with virtual reality and/or mixed reality content.

A head-mounted device such as a pair of mixed reality glasses that is worn on the head of a user may have a camera such as an outwardly facing camera. During operation, the camera can capture a moving image of the real-world environment surrounding a user so that control circuitry in the electronic device can display the real-world content for the user. The user may also be provided a user with computer-generated content (sometimes referred to as virtual content).

The head-mounted device may operate in a virtual reality mode in which virtual reality (computer-generated) content is displayed for a user. In this mode of operation, real-world content captured by the camera is not displayed. The head-mounted device may also operate in a mixed reality mode. In the mixed reality mode, virtual content (sometimes referred to as non-real-world content) is overlaid on the real-world content captured by the camera. The virtual content may, for example, be text, graphics, moving images, and/or other content that is displayed over portions of the real-world content that is displayed.

To ensure that content is displayed satisfactorily, display and camera settings may be adjusted dynamically when transitioning between virtual reality and mixed reality modes. A camera can captured images at a camera frame rate (sometimes referred to as an image capture frame rate) and a display can display content (e.g., a moving image) at a display frame rate. When transitioning between virtual and mixed reality modes, the camera and display frame rates can be adjusted dynamically and operations such as camera reconfiguration operations may be performed at times that minimize disruptions to system operation.

Figure 1:
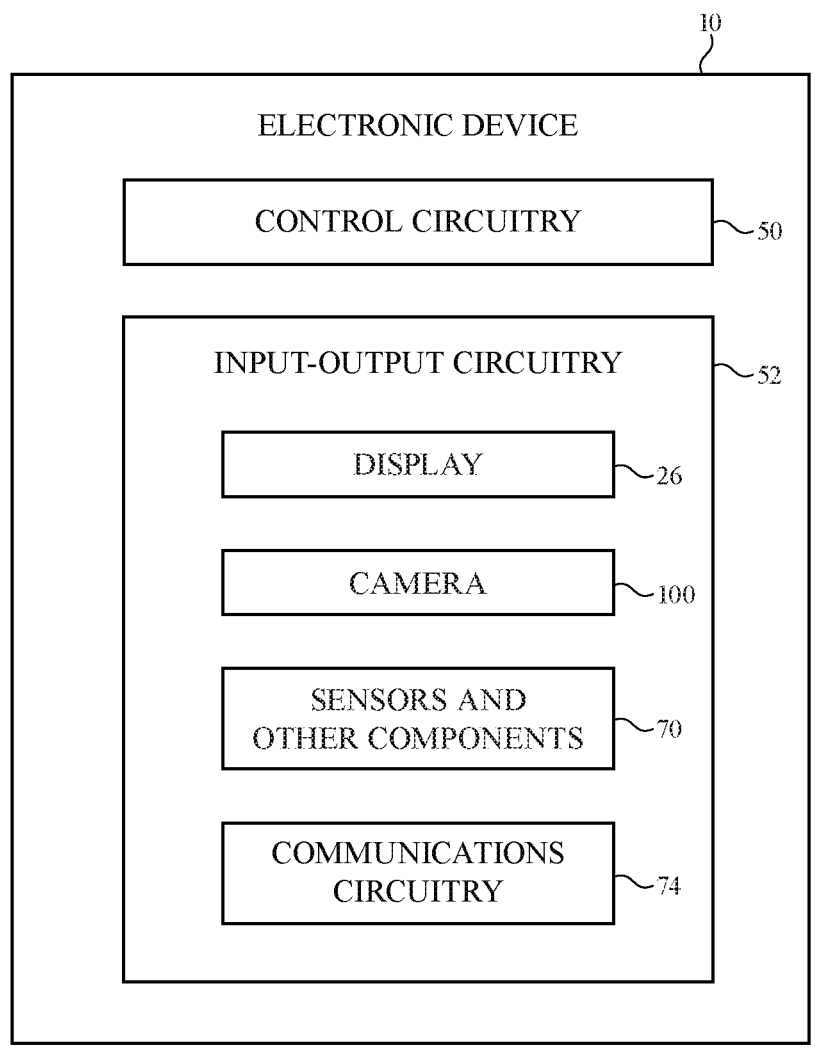
FIG. 1 is a schematic diagram of an illustrative electronic device such as a head-mounted device in accordance with an embodiment.

A schematic diagram of an illustrative electronic device of the type that may adjust camera and display operation when transitioning between virtual reality and mixed reality modes is shown in FIG. 1. As shown in FIG. 1, electronic device 10 (e.g., a head-mounted device) may have control circuitry 50. Control circuitry 50 may include storage and processing circuitry for controlling the operation of head-mounted display 10. Circuitry 50 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units, application specific integrated circuits, and other integrated circuits. Software code may be stored on storage in circuitry 50 and run on processing circuitry in circuitry 50 to implement operations for electronic device 10 (e.g., controlling a camera during image operations, controlling sensors and other components during other data gathering operations, controlling displays and other components, performing image rendering operations and other operations involved in generating computer-generated content to be displayed for a user in virtual reality and/or mixed reality operating modes, etc.).

Electronic device 10 may include input-output circuitry 52. Input-output circuitry 52 may be used to allow virtual-reality content and other data to be received by device 10 from external equipment (e.g., a tethered computer, a portable device such as a handheld device or laptop computer, or other electrical equipment) and to allow a user to provide device 10 with user input. Input-output circuitry 52 may also be used to gather information on the environment in which electronic device 10 is operating. Output components in circuitry 52 may allow electronic device 10 to provide a user with output and may be used to communicate with external electrical equipment.

As shown in FIG. 1, input-output circuitry 52 may include one or more displays such as display 26. Display 26 may be used to display images for a user of device 10. Display 26 has a pixel array to generate images that are presented to a user (e.g., through a lens). Display 26 may be an organic light-emitting diode display, a display having a pixel array formed from crystalline semiconductor light-emitting diode dies, a liquid crystal display, a liquid-crystal-on-silicon display, an electrophoretic display, a microelectromechanical systems display, and/or other suitable display.

Input-output circuitry 52 may have one or more cameras such as camera 100. Camera 100 may be an outwardly facing camera that captures real-world content (a moving image of the environment surrounding the user).

Sensors and other components 70 in input-output circuitry may include sensors such as ambient light sensors that measure ambient light intensity and/or ambient light color, force sensors, temperature sensors, touch sensors, capacitive proximity sensors, light-based proximity sensors, other proximity sensors, strain gauges, gas sensors, pressure sensors, moisture sensors, magnetic sensors, position and motion sensors (e.g., compasses, gyroscopes, accelerometers, and/or other devices for monitoring the location, orientation, and movement of device 10), microphones, and other input-output devices such as buttons, keyboard keys, haptic output devices, speakers, etc.

Input-output circuitry 52 may include communications circuitry 74 that allows electronic device 10 (e.g., control circuitry 50) to communicate with external equipment (e.g., remote controls, joysticks and other input controllers, portable electronic devices, computers, displays, etc.) and that allows signals to be conveyed between components (circuitry) at different locations in device 10. Communications circuitry 74 may include wired and/or wireless communications circuitry (e.g., antennas and radio-frequency transceiver circuitry operating in cellular telephone bands, wireless local area network bands, etc.).

Figure 2:
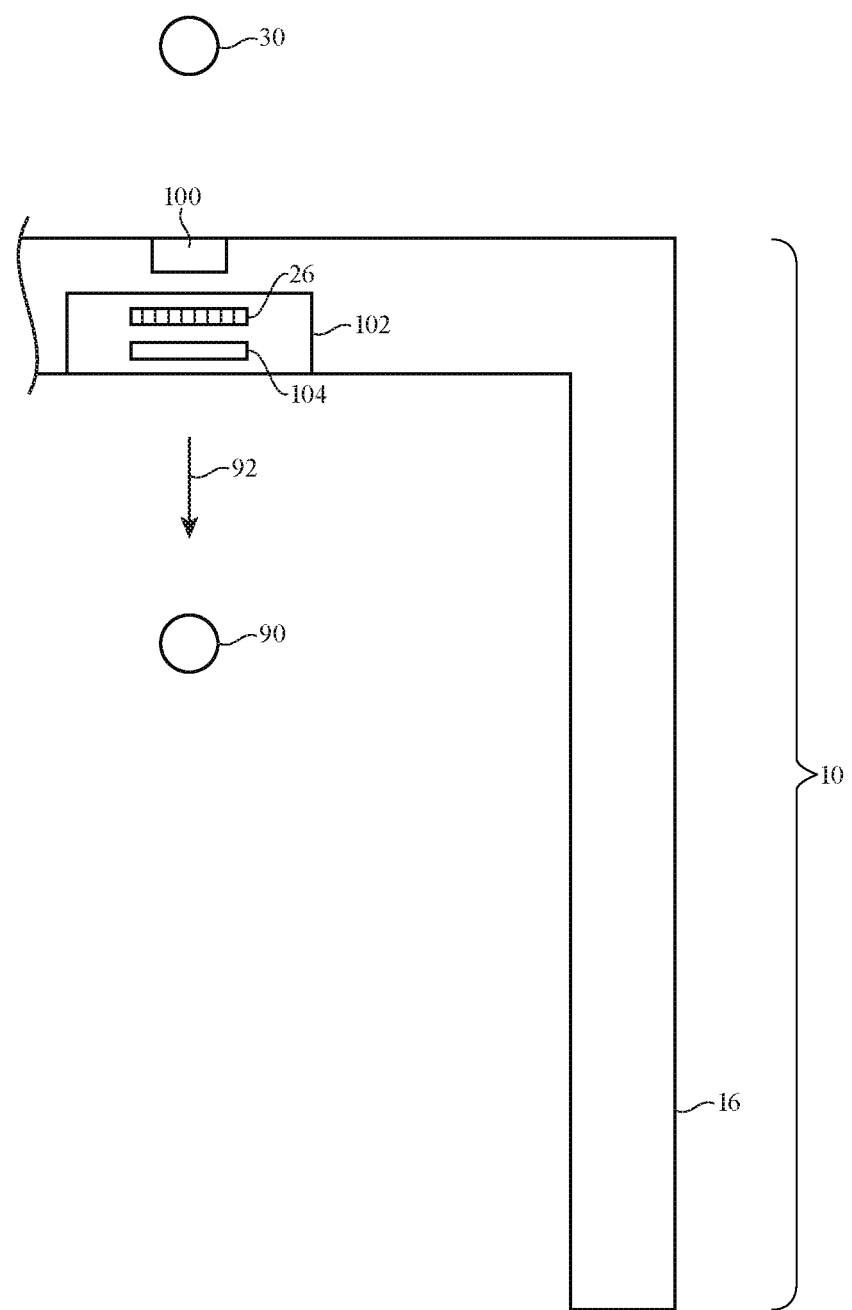
FIG. 2 is a diagram of an illustrative electronic device such as a head-mounted device in accordance with an embodiment.

The components of electronic device 10 may be supported by a head-mountable support structure such as illustrative support structure 16 of FIG. 2. Support structure 16, which may sometimes be referred to as a housing, may be configured to form a frame of a pair of glasses (e.g., left and right temples and other frame members), may be configured to form a helmet, may be configured to form a pair of goggles, or may have other head-mountable configurations.

One or more cameras such as camera 100 may capture real-world content (e.g., images of external objects in the user's environment such as an image of external object 30 of FIG. 2). Display system 102 may include display 26 and lens 104 for displaying images in direction 92 for viewing by a user such as viewer 90.

Figure 3:
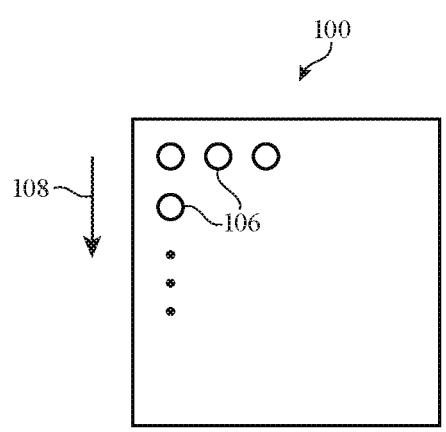
FIG. 3 is a diagram showing how image data may be acquired with a camera in an electronic device in accordance with an embodiment.
Figure 4:
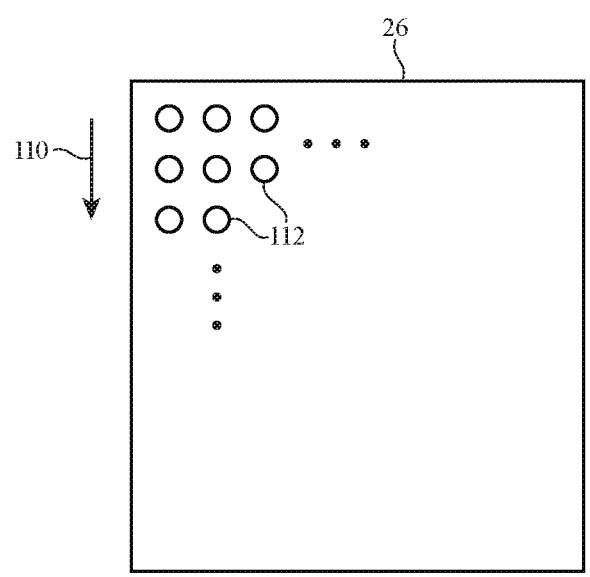
FIG. 4 is a diagram showing how image content may be displayed on a display in an electronic device in accordance with an embodiment.

During operation of device 10, it may sometimes be desirable to operate camera 100 and display 26 in a beam chasing mode. As shown in FIG. 3, camera 100 may have an array of image sensor pixels (e.g., rows and columns of sensor pixels 106 in a digital image sensor integrated circuit). Images may be captured by scanning through the rows of image sensor pixels 106 in direction 108. Images may be captured in frames using this arrangement. The rate at which frames is captured is sometimes referred to at the frame rate. As shown in FIG. 4, display 26 may have an array of display pixels (e.g., rows and columns of display pixels 112 in a pixel array for display 26). During operation of display 26, control signals for rows of display pixels 112 may be asserted in sequence (e.g., so that images are displayed by scanning through the rows of display pixels 112 in direction 110). Images may be displayed in frames. The rate at which frames are refreshed on display 26 is sometimes referred to as the display frame rate. In beam chasing mode, it is not necessary to wait until all rows of image sensor pixels 106 have been scanned before displaying captured image sensor data on corresponding rows of display pixels 112, thereby lowering display latency.

Figure 5:
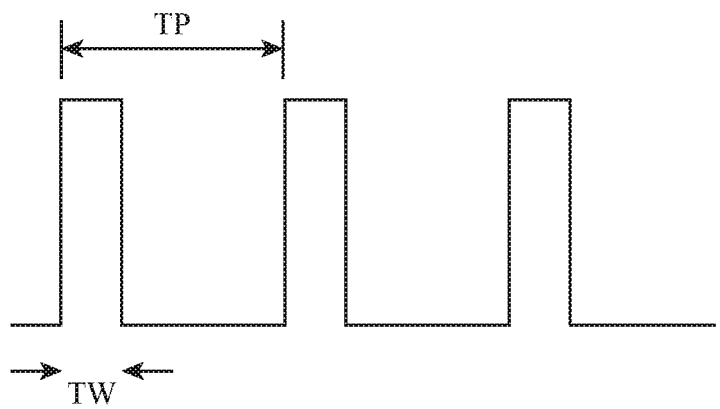
FIGS. 5 and 6 are graphs in which output intensity has been plotted as a function of time for a low-persistence display operating at two different frame rates in accordance with an embodiment.
Figure 6:
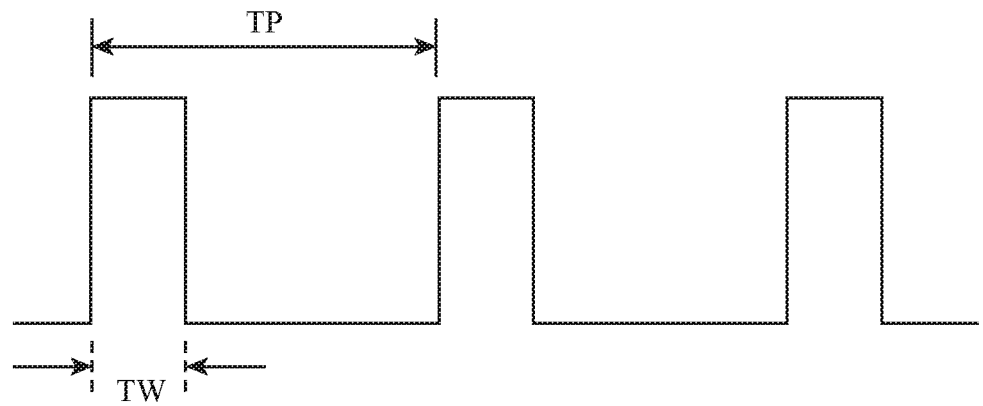

Display quality can also be enhanced by operating display 26 in a low persistence mode. In the low persistence mode, output light from pixels 112 is displayed for a fraction (e.g., 25%, at least 20%, less than 30%, etc.) of the total frame duration for display 26 to reduce motion blur effects. As shown in the example of FIG. 5, output light pulse duration TW is a fraction of frame duration TP. In the example of FIG. 5, the frame rate of display 26 is 120 Hz. In the example of FIG. 6, the frame rate of display 26 is 96 Hz, so frame duration TP is lengthened relative to frame duration TP of FIG. 5 and output light pulse duration TW is lengthened relative to output light pulse duration TW of FIG. 5.

In certain lighting environments such as florescent lighting environments, images captured with certain frame rates may flicker. For example, in certain countries, florescent lighting is driven with 50 Hz alternating-current signals. Images captured with a camera frame rate of 120 Hz while a scene is illuminated with this florescent lighting tend to exhibit flicker. The flicker can be reduced or eliminated by operating the camera at 96 Hz (e.g., so that each 10.4 ms period of the 96 Hz frame rate is occupied by a 0.4 ms buffer time and a 10 ms camera exposure time that reduces flicker). Other camera frame rates less than 100 Hz may also be used. These camera frame rates may be used when capturing real-world content while operating in mixed reality mode. In the mixed reality mode, display 26 can be operated with a corresponding display frame rate (refresh rate) of 96 Hz to implement beam chasing.

When it is desired to operate in virtual reality mode, camera 100 can be used at a low camera frame rate (e.g., 30 Hz). The 96 Hz frame rate that is used to capture real-world content to display on display 26 is not needed during mixed reality mode. Rather, camera 100 can use the 30 Hz camera frame rate to detect external object location and motion. Detected external objects in this mode may be rendered in a virtual world, but because camera 100 is being used to detect object location and motion and not to capture high quality images for displaying to a user, it is not necessary to use the 96 Hz frame rate. Computer generated content (e.g., virtual reality content) can be displayed at a relatively high display frame rate (e.g., 120 Hz or other integral multiple of the 30 Hz camera frame rate) to minimize motion blur.

There are therefore two different sets of camera and display settings for device 10. In virtual reality mode, display 126 can be operated with a first display frame rate (e.g., 120 Hz to minimize motion blur) and camera 100 can be operated with a first camera frame rate (e.g., 30 Hz). In this configuration, the 120 Hz display frame rate is an integral multiple (4) of the 30 Hz camera frame rate, so beam chasing operations may be performed). In the mixed reality mode, camera 100 can be operated at a second camera frame rate (e.g., 96 Hz with a 10 ms exposure time and a 0.4 ms buffer time) to help reduce flickering from florescent lighting and display 26 can be operated at a second display frame rate (e.g., a 96 Hz rate that is equal to the second camera frame rate to allow beam chasing operations to be performed).

During operation of device 10, device 10 may transition between virtual reality mode and mixed reality mode (and vice versa). As an example, a user may wish to toggle between these modes and may press a button or otherwise supply input that directs device 10 to switch modes. As another example, camera 100 or other sensors in device 10 may detect that a person is walking into the field of view of camera 100 and may automatically switch between virtual reality mode (in which the user cannot view the surrounding environment) and mixed reality mode (in which the person walking into the field of view of camera 100 is visible).

As described in connection with FIGS. 5 and 6, abrupt transitions between different display frame rates may result in undesired visibly noticeable display luminance variations. Accordingly, when transitioning between virtual reality mode and mixed reality mode (e.g., from virtual reality mode to mixed reality mode or vice versa), a gradual display frame rate transition may be made. As an example, the frame period associated with the frame rate may be varied by less than 0.1 ms per frame (e.g., the frame period increment rate or decrement rate may be less than 0.1 ms per frame or other suitable value).

Figure 7:
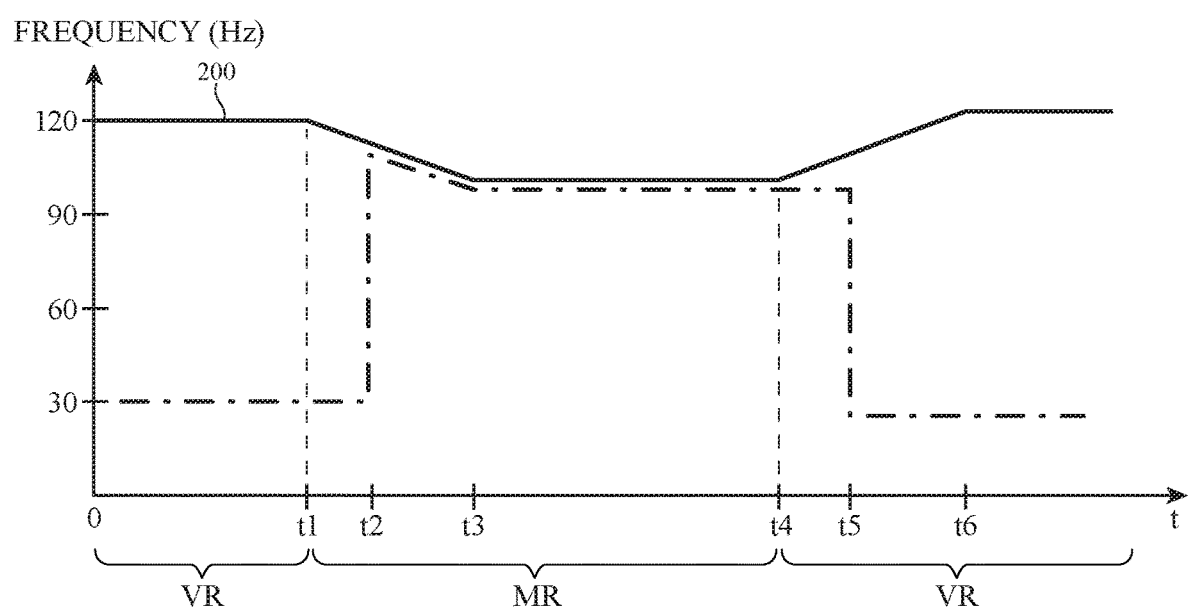
FIG. 7 is a graph showing how display and camera frame rates may be adjusted when transitioning between virtual reality and mixed reality modes in an electronic device in accordance with an embodiment.

The use of gradual transitions in frame rate when switching between virtual reality mode and mixed reality mode is shown in FIG. 7. Curve 200 corresponds to the display frame rate of display 26. During the time period before time t1, device 10 is operating in virtual reality mode. Accordingly, the display frame rate is 120 Hz. At time t1, device 10 transitions between virtual reality (VR) mode and mixed reality (MR) mode. There is a gradual change in frame rate between time t1 (when the frame rate begins to decrease) and time t3 (when the frame rate for display 26 has been reduced to 96 Hz from its initial value of 120 Hz). Similarly, when exiting mixed reality mode, there is a gradual change in frame rate between time t4 (when the frame rate begins to increase) and time t6 (when the frame rate for display 26 has been increased to 120 Hz).

Camera reconfiguration operations may also be performed in a way that helps minimize visual disruptions for a user. A camera reconfiguration operation takes place when control circuitry 50 adjusts camera 26 (e.g., to provide camera 26 with a new frame rate and/or additional settings such as a frame rate adjustment rate and time period). During the camera reconfiguration operation, a camera that has been directed to change its frame rate settings reconfigures itself for operation at the new settings. There is typically a 100 ms delay during camera reconfiguration. During this time, camera 100 does not capture images.

The transition time associated with adjusting frame rate between virtual reality mode and mixed reality mode (the time period between times t1 and t3 in the example of FIG. 7) may take 200 ms (as an example). To avoid visual disruptions that might otherwise arise from waiting to reconfigure camera 26 only after this transition time is complete, camera reconfiguration may be performed immediately upon exiting virtual reality mode (e.g., at time t1 of FIG. 7). For example, camera 100 can be reconfigured between times t1 and t2 of FIG. 7. This avoids situations in which a person or other external object entering the field of view of camera suddenly pops into view on display 26.

Following camera reconfiguration at time t2, display frame rate transitioning may not be complete. To avoid latency issues that might otherwise arise from lack of synchronization between the camera frame rate and the display frame rate, control circuitry 50 can direct camera 26 to adjust its frame rate to synchronize the camera and display frame rates during the transition period. Curve 202 of FIG. 7 corresponds to the camera frame rate for camera 100. At times before time t1, the camera frame rate is set to 30 Hz for virtual reality mode operation. During the frame rate transition period (e.g., between times t1 and t3 or at least during times between time t2 and t3 as shown in the example of FIG. 7), camera frame rate 202 is synchronized to display frame rate 200 to avoid latency issues.

Between time t3 and t4 in the example of FIG. 7, device 10 operates normally in mixed reality mode. Upon exiting mixed reality mode at time t4, camera 100 can be reconfigured (times t4 to t5) and the camera frame rate reduced to 30 Hz (at time t5) to conserve power. No camera content is being displayed in the virtual reality mode, so it is not necessary to synchronize the camera and display frame rates during the display frame rate transition taking place between times t4 to t6.

The foregoing is merely illustrative and various modifications can be made to the described embodiments. The foregoing embodiments may be implemented individually or in any combination.

What is claimed is:
1. An electronic device comprising:
   a display;
   a camera; and
   control circuitry configured to:
      control the display to exhibit a transitional display frame rate when transitioning between a first mode in which virtual reality content is displayed on the display and a second mode in which mixed reality content is displayed on the display using a display frame rate that is less than the transitional display frame rate, and
      control the camera to operate at a camera frame rate synchronized with the transitional display frame rate when the display exhibits the transitional display frame rate.
2. The electronic device defined in claim 1, wherein the control circuitry is configured to control the display to display the virtual reality content at a display frame rate different than the transitional display frame rate and different than the display frame rate used to display the mixed reality content.

3. The electronic device defined in claim 1, wherein the control circuitry is configured to control the display to transition between the first and second modes using a frame period change rate of less than 0.1 ms per frame.

4. The electronic device defined in claim 1, wherein the mixed reality content includes real-world content from the camera.

5. The electronic device defined in claim 4, wherein the virtual reality content excludes real-world content from the camera.

6. The electronic device defined in claim 1, wherein the display includes display pixels, the mixed reality content is refreshed on the display pixels at the display frame rate during the second mode, and the virtual reality content is refreshed on the display pixels at a display frame rate during the first mode different than the display frame rate during the second mode.

7. The electronic device defined in claim 6, wherein the control circuitry is configured to control the camera to operate at a camera frame rate during the first mode that is different than the camera frame rate synchronized with the transitional display frame rate, and the display frame rate during the first mode is an integer multiple of the camera frame rate during the first mode.

8. The electronic device defined in claim 6, wherein the control circuitry is configured to control the camera to operate at a camera frame rate during the second mode that is different than the camera frame rate synchronized with the transitional display frame rate, and the display frame rate during the second mode is an integer multiple of the camera frame rate during the second mode.

9. The electronic device defined in claim 1, wherein the control circuitry is configured to control the camera to operate at a camera frame rate during the first mode that is different than the camera frame rate synchronized with the transitional display frame rate and to operate at a camera frame rate during the second mode that is different than the camera frame rate synchronized with the transitional display frame rate and different than the camera frame rate during the first mode.

10. The electronic device defined in claim 1, wherein the control circuitry is configured to perform beam chasing operations using the display and the camera in the first mode and in the second mode.

11. An electronic device comprising:
a display;
a camera; and
control circuitry configured to operate the camera and the display at:
a first setting in which the camera captures a first set of image frames at a first camera frame rate, and in which the display displays augmented reality content that includes at least a portion of the captured first set of image frames and non-real-world content, and
a second setting in which the camera captures a second set of image frames at a second camera frame rate different than the first camera frame rate, and in which the display displays virtual reality content that includes non-real-world content and excludes the second set of image frames, wherein the first camera frame rate is greater than the second camera frame rate.

12. The electronic device defined in claim 11, wherein the control circuitry is configured to detect an object based on the captured second set of image frames in the second setting.

13. The electronic device defined in claim 12, wherein the control circuitry is configured to detect a location or a motion associated with the object based on the captured second set of image frames in the second setting.

14. The electronic device defined in claim 12, wherein the control circuitry is configured to transition the camera and the display from the second setting to the first setting based on the detected object.

15. An electronic device comprising:
a display; and
control circuitry coupled to the display and configured to:
operate the display to display content at a frame rate in a virtual reality mode, and
operate the display to transition out of the virtual reality mode by varying the frame rate, at which the content is displayed during the transition, by a constant adjustment rate across a transition time period for the transition.

16. The electronic device defined in claim 15, wherein varying the frame rate by the constant adjustment rate across the transition time period comprises decrementing the frame rate by a decrement rate across the transition time period.

17. The electronic device defined in claim 15, wherein the control circuitry is configured to operate the display to display the content at a non-zero frame rate at an end of the transition time period.

18. The electronic device defined in claim 17, wherein the control circuitry is configured to operate the display to display the content at the non-zero frame rate in a mixed reality mode.

* * * * *